United States Patent
D'Agosto et al.

(10) Patent No.: US 11,446,910 B2
(45) Date of Patent: Sep. 20, 2022

(54) MULTILAYER FILMS CONTAINING A SLIP AGENT

(71) Applicants: Dow Global Technologies LLC, Midland, MI (US); PBBPolisur S.R.L., Buenos Aires (AR)

(72) Inventors: Silvina Vanesa D'Agosto, Buenos Aires (AR); Nicolas Cardoso Mazzola, Jundiai-SP (BR); Marcelo Delmar Cantu, Jundiai-SP (BR); Jorge Caminero Gomes, Jundiai-SP (BR)

(73) Assignees: Dow Global Technologies LLC, Midland, MI (US); PBBPolisur S.R.L., Buenos Aires (AR)

( * ) Notice: Subject to any disclaimer, the term of this patent is extended or adjusted under 35 U.S.C. 154(b) by 188 days.

(21) Appl. No.: 16/604,300

(22) PCT Filed: Apr. 9, 2018

(86) PCT No.: PCT/US2018/026683
§ 371 (c)(1),
(2) Date: Oct. 10, 2019

(87) PCT Pub. No.: WO2018/191151
PCT Pub. Date: Oct. 18, 2018

(65) Prior Publication Data
US 2020/0031106 A1 Jan. 30, 2020

Related U.S. Application Data

(60) Provisional application No. 62/484,527, filed on Apr. 12, 2017, provisional application No. 62/517,305, (Continued)

(51) Int. Cl.
B32B 27/32 (2006.01)
B32B 27/08 (2006.01)
(Continued)

(52) U.S. Cl.
CPC .............. B32B 27/32 (2013.01); B32B 27/08 (2013.01); B32B 27/18 (2013.01); B32B 27/20 (2013.01);
(Continued)

(58) Field of Classification Search
CPC ......... B32B 27/32; B32B 27/20; B32B 27/08; B32B 27/18; B32B 27/22; B32B 27/26;
(Continued)

(56) References Cited

U.S. PATENT DOCUMENTS 4,786,533 A 11/1988 Crass et al.
5,213,744 A 5/1993 Bossaert
(Continued)

FOREIGN PATENT DOCUMENTS

CA 1313580 C 2/1993
CA 2435625 A1 8/2002
(Continued)

*Primary Examiner* — James C Yager
(74) *Attorney, Agent, or Firm* — Quarles & Brady LLP

(57) ABSTRACT

The present disclosure provides a multilayer film containing at least three layers, including (A) a core layer containing a high density polyethylene (HDPE) having a density from 0.940 g/cc to 0.980 g/cc; and (B) skin layers on opposite sides of the core layer. Each skin layer includes (i) a propylene/ethylene copolymer with from greater than 0 wt % to 5 wt % units derived from ethylene comonomer; (ii) from 3,000 to 3,500 ppm of a slip agent; and (iii) from 4,000 to 10,000 ppm of an antiblock agent.

18 Claims, 1 Drawing Sheet

Related U.S. Application Data filed on Jun. 9, 2017, provisional application No. 62/564,633, filed on Sep. 28, 2017.

(51) Int. Cl.
*B32B 27/18* (2006.01)
*B32B 27/20* (2006.01)

(52) U.S. Cl.
CPC ..... *B32B 2250/03* (2013.01); *B32B 2250/242* (2013.01); *B32B 2250/40* (2013.01); *B32B 2264/102* (2013.01); *B32B 2264/104* (2013.01); *B32B 2270/00* (2013.01); *B32B 2307/50* (2013.01); *B32B 2307/732* (2013.01); *B32B 2307/746* (2013.01); *B32B 2323/043* (2013.01); *B32B 2323/10* (2013.01); *B32B 2383/00* (2013.01); *B32B 2439/70* (2013.01); *Y10T 428/1352* (2015.01)

(58) Field of Classification Search
CPC ............ B32B 2270/00; B32B 2307/54; B32B 2307/544; B32B 2307/50; B32B 2307/746; B32B 2307/732; B32B 2250/03; B32B 2250/40; B32B 2250/242; B32B 2250/04; B32B 2264/102; B32B 2264/104; B32B 2323/043; B32B 2323/10; B32B 2383/00; B32B 2439/70; B32B 2274/00; Y10T 428/1352

See application file for complete search history.

(56) References Cited

U.S. PATENT DOCUMENTS

| | | | |
|---|---|---|---|
| 5,496,600 | A | 3/1996 | Peiffer et al. |
| 6,013,353 | A * | 1/2000 | Touhsaent ............... B32B 27/32 |
| | | | 428/203 |
| 6,060,139 | A | 5/2000 | Peiffer et al. |
| 6,562,886 | B1 * | 5/2003 | Minami ............... C08K 5/1575 |
| | | | 524/115 |
| 6,825,276 | B2 | 11/2004 | Forte et al. |
| 8,067,501 | B2 | 11/2011 | Fiscus et al. |
| 2008/0308966 | A1 | 12/2008 | Anzanello |
| 2010/0075079 | A1 | 3/2010 | Bernal-Lara et al. |
| 2012/0207954 | A1 | 8/2012 | Dalpe et al. |
| 2014/0234689 | A1 | 8/2014 | Kim et al. |

FOREIGN PATENT DOCUMENTS

| | | |
|---|---|---|
| EP | 0441027 A2 | 8/1991 |
| EP | 0471571 A2 | 2/1992 |
| EP | 0432452 B1 | 9/1995 |
| EP | 0638415 B1 | 3/2000 |
| NZ | 505864 A | 4/2002 |
| WO | 2007149900 A2 | 12/2007 |

* cited by examiner

US 11,446,910 B2

MULTILAYER FILMS CONTAINING A SLIP AGENT

BACKGROUND

The present disclosure relates to multilayer films containing a slip agent.

Film layers formed from polyolefins are used in multilayer films for confectionary packaging, and specifically for twist packaging for wrapping confectionaries. Multilayer film twist packaging requires a balance of (i) high twist retention to retain the wrapped form and (ii) low coefficient of friction (COF) (e.g., less than 0.35) to improve machine processing of the multilayer film. However, polyolefin film layers typically exhibit one or both of poor twist retention and high COF.

The art recognizes the need for a multilayer film with skin layers containing a polyolefin that exhibits a low COF (e.g., less than 0.35) and high twist retention.

SUMMARY

The present disclosure provides a multilayer film containing at least three layers, including:

(A) a core layer comprising a high density polyethylene (HDPE) having a density from 0.940 g/cc to 0.980 g/cc;

(B) skin layers on opposite sides of the core layer, each skin layer comprising (i) a propylene/ethylene copolymer with from greater than 0 wt % to 5 wt % units derived from ethylene comonomer;

(ii) from 3,000 to 3,500 ppm of a slip agent; and (iii) from 4,000 to 10,000 ppm of an antiblock agent.

Definitions

Figure 1:
FIG. 1 is a perspective view of a twist-wrapped confectionary in accordance with an embodiment of the present disclosure.

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. A nonlimiting example of an ethylene-based polymer (polyethylene) is high density polyethylene (HDPE).

An "olefin-based polymer" or "polyolefin" is a polymer that contains more than 50 weight percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably. A nonlimiting example of a propylene-based polymer (polypropylene) is a propylene/α-olefin copolymer with at least one C2 or C4-C10 α-olefin comonomer, or a C2 α-olefin comonomer.

Test Methods

Coefficient of Friction (COF) is measured according to ASTM D1894. The substrate employed for COF determinations is DOW HDPE DGDB-2480 NT, which is a high-density polyethylene commercially available from The Dow Chemical Company, Midland, Mich., USA.

Density is measured in accordance with ASTM D792, Method B. The result is recorded in g/cc.

Melt index (MI) (I2) in g/10 min for ethylene-based polymers is measured using ASTM D-1238-04 (190° C./2.16 kg).

Melt flow rate (MFR) in g/10 min for propylene-based polymers is measured using ASTM D-1238-04 (230° C./2.16 kg).

Figure 2:
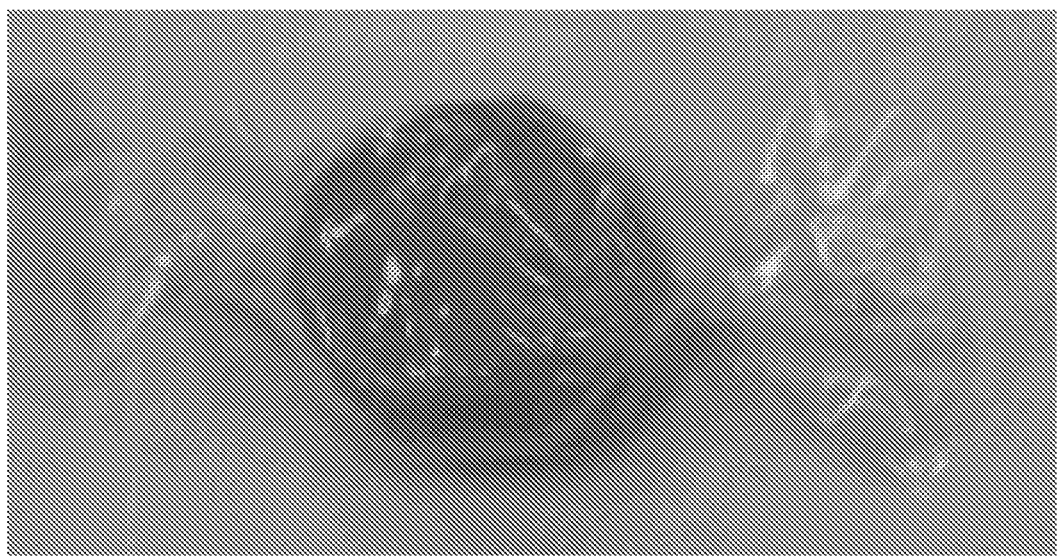
FIG. 2 is a perspective view of an unwrapped confectionary.

Twist retention after 7 days aging is determined by the following procedure. The film is cut into a 80 mm×80 mm sample. A person then folds the film sample around a piece of Arcor™ Butter Toffee (a hard candy). The person then twists opposing ends of the film tightly around the hard candy piece to resemble the twist-wrapped hard candy single as shown in FIG. 1. Each film sample is cut in the same direction along extrusion and the twist procedure is made by the same individual to minimize variations between samples. Five or six wrapped candies are produced. Each wrapped candy is stored at ambient conditions (23° C., 760 mmHg, 50% relative humidity) and visually observed each day over a period of 7 days to determine whether the multilayer film retains its fold/twist or whether the film unwraps. An unwrapped hard candy is one whereby the fold/twist is not retained, such that the film becomes displaced from its original twist-wrapped hard candy form, as shown in FIG. 2. The number of samples that retain their fold/twist is recorded each day. Twist retention after 7 days aging is reported as the percentage of samples that retain their fold/twist after 7 days.

Yield tension is measured in accordance with ASTM D882. Yield tension is measured in the machine direction of the film.

Differential Scanning Calorimetry (DSC)

Differential Scanning calorimetry (DSC) can be used to measure the melting, crystallization, and glass transition behavior of a polymer over a wide range of temperature. For example, the TA Instruments C11000 DSC, equipped with an RCS (refrigerated cooling system) and an autosampler is used to perform this analysis. During testing, a nitrogen purge gas flow of 50 ml/min is used. Each sample is melt pressed into a thin film at 190° C.; the melted sample is then air-cooled to room temperature (25° C.). A 3-10 mg, 6 mm diameter specimen is extracted from the cooled polymer, weighed, placed in a light aluminum pan (50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −80° C. at a 10° C./minute cooling rate and held isothermal at −80° C. for 3 minutes. The sample is then heated to 180° C. (this is the "second heat" ramp) at a 10° C./minute heating rate. The cooling and second heating curves are recorded. The values determined are extrapolated onset of melting, Tm, and extrapolated onset of crystallization, Tc. Heat of fusion (Hf) (in Joules per gram), the calculated % crystallinity for polyethylene samples using the following equation: % Crystallinity=((Hf)/292 J/g)×100; and the calculated % crystallinity for polypropylene samples using the following equation: % Crystallinity=((Hf)/165 J/g)×100.

The heat of fusion (Hf) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, The Basis of Thermal Analysis, in Thermal Characterization of Polymeric Materials 92, 277-278 (Edith A. Turi ed., 2d ed. 1997).

$^{13}$C NMR Experimental Procedure for Propylene/Ethylene Copolymers $^{13}$C NMR is used for ethylene content, Koenig B-value, triad distribution, and triad tacticity and is performed as follows:

Sample Preparation (Propylene/Ethylene Copolymers)—

The samples are prepared by adding approximately 2.7 g of a 50/50 mixture of tetrachloroethane-$d_2$/orthodichlorobenzene containing 0.025 M Cr(AcAc)$_3$ to 0.20-0.30 g sample in a Norell 1001-7 10 mm NMR tube. The samples are dissolved and homogenized by heating the tube and its contents to 150° C. using a heating block and heat gun. Each sample is visually inspected to ensure homogeneity.

Data Acquisition Parameters (Propylene/Ethylene Copolymers)—

The data is collected using a Bruker 400 MHz spectrometer equipped with a Bruker Dual DUL high-temperature CryoProbe. The data is acquired using 320 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 7 minutes prior to data acquisition. Percent mm tacticity and wt % ethylene is then determined according to methods commonly used in the art.*

*References: For composition (wt % E): S. Di Martino and M. Kelchtermans; J. Appl. Polym. Sci., V 56, 1781-1787 (1995); Tacticity, detailed assignments: V. Busico, R. Cipullo; Prog. Polym. Sci. V 26, 443-533 (2001).

The "Koenig B-value" or chi statistic is one measure of randomness or blockiness in a propylene/ethylene random copolymer. A value of 1.0 indicates a random copolymer and a value of zero indicates complete blocks of monomers A and B. A B-value of 2 indicates an alternating copolymer. B=[EP]/(2[P][E]), where [EP] is the total mole fraction of EP dimers (EP+PE, or (EEP+PPE+PEP+EPE)), and [E] is the mole fraction ethylene, and [P]=1−[E]. Jack L. Koenig, Spectroscopy of Polymers (2d ed. 1999).

$^1$H NMR Analysis—Total Unsaturation Per Mole Propylene

Samples are prepared by adding approximately 3.25 g of a 50/50 mixture of tetrachloroethane-d2/perchlorethylene that is 0.0015 M in chromium acetylacetonate (relaxation agent) to 0.130 g sample in a 10 mm NMR tube. The samples are dissolved and homogenized by heating the tube and its contents to 110° C. The data is collected using a Bruker 400 MHz spectrometer equipped with a Bruker Dual DUL high-temperature CryoProbe. The unsaturation data is collected using 4 scans per data file, a 15.6 second pulse repetition delay with a sample temperature of 120° C. The acquisition is carried out using spectral width of 10,000 Hz and a file size of 16K data points. The presaturation experiment is run with a modified pulse sequence, lc1prf2.zz1 using 100 scans per data file. The following calculations were used:

Moles of H from propylene: Mol fraction proplene*(integral area $\delta$ 3.5 – 0.2 ppm)

Total moles propylene $$\frac{\text{moles H from propylene}}{6 \text{ protons}}$$

Mol % vinyl unsaturation/mol propylene $$\frac{100 * \text{moles vinyl}}{\text{Total moles propylene}}$$

Mol % *Cis/Trans* Unsaturation/mol propylene

Mol % trisubstituted unsaturation/mol propylene $$\frac{100 * \text{moles } cis/trans}{\text{Total moles propylene}}$$

$$\frac{100 * \text{moles } trisub}{\text{Total moles propylene}}$$

Mol % vinylidene unsaturation/mol propylene $$\frac{100 * \text{moles } cis/trans}{\text{Total moles propylene}}$$

Total mol % unsaturation/mol propylene

Mol % vinyl + Mole *cis* &*trans* + Mol % *trisub* + Mol + vinylidene

DETAILED DESCRIPTION

The present disclosure provides a multilayer film. In an embodiment, the multilayer film contains at least three layers, including (A) a core layer containing a high density polyethylene (HDPE) having a density from 0.940 g/cc to 0.980 g/cc; and (B) skin layers on opposite sides of the core layer. Each skin layer includes (i) a propylene/ethylene copolymer with from greater than 0 wt % to 5 wt % units derived from ethylene comonomer; (ii) from 3,000 to 3,500 ppm of a slip agent; and (iii) from 4,000 to 10,000 ppm of an antiblock agent.

A. Core Layer

The multilayer film contains a core layer. The core layer contains a high density polyethylene (HDPE) having a density from 0.940 g/cc to 0.980 g/cc.

"High density polyethylene" (or "HDPE") is an ethylene homopolymer or an ethylene/α-olefin copolymer with at least one C4-C10 α-olefin comonomer, or C8 α-olefin comonomer and a density from 0.940 g/cc, or 0.945 g/cc, or 0.950 g/cc, or 0.955 g/cc, or 0.958 g/cc to 0.960 g/cc, or 0.962 g/cc, or 0.965 g/cc, or 0.970 g/cc, or 0.975 g/cc, or 0.980 g/cc. In an embodiment, the HDPE has a density from greater than 0.940 g/cc, or 0.945 g/cc, or 0.950 g/cc, or 0.955 g/cc, or 0.958 g/cc to 0.960 g/cc, or 0.962 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/C4-C10 α-olefin copolymer that has one distinct peak in a gel permeation chromatography (GPC) showing the molecular weight distribution. A nonlimiting example of a suitable monomodal HDPE is AXELERON™ FO 6318 BK CPD, available from The Dow Chemical Company. A "multimodal ethylene copolymer" is an ethylene/C4-C10 α-olefin copolymer that has at least two distinct peaks in a GPC showing the molecular weight distribution. Multimodal includes copolymer having two peaks (bimodal) as well as copolymer having more than two peaks. Nonlimiting examples of suitable multimodal HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

In an embodiment, the HDPE includes from greater than 50 wt %, or 55 wt %, or 60 wt %, or 65 wt % to 70 wt %, or 75 wt %, or 80 wt %, or 85 wt %, or 90 wt %, or 95 wt %, or 97 wt %, or 99 wt %, or 100 wt % units derived from ethylene and a reciprocal amount, or from 0 wt %, or 1 wt %, or 3 wt %, or 5 wt %, or 10 wt %, or 15 wt %, or 20 wt %, or 25 wt %, or 30 wt % to 35 wt %, or 40 wt %, or 45 wt %, or less than 50 wt % units derived from a comonomer, based on the total weight of the HDPE.

In an embodiment, the HDPE has a melt index (MI) of from 0.1 g/10 min, or 0.5 g/10 min to 1.0 g/10 min, or 1.5 g/10 min, or 2.0 g/10 min. In another embodiment, the HDPE has a melt index (MI) from 0.1 g/10 min to less than 2.0 g/10 min.

In an embodiment, the HDPE has one, some, or all of the following properties:

(i) a density of from 0.940 g/cc, or 0.945 g/cc, or 0.950 g/cc, or 0.955 g/cc, or 0.958 g/cc to 0.960 g/cc, or 0.962 g/cc, or 0.965 g/cc, or 0.970 g/cc, or 0.975 g/cc, or 0.980 g/cc; and/or (ii) a melt index (MI) of from 0.1 g/10 min, or 0.5 g/10 min to 1.0 g/10 min, or 1.5 g/10 min, or 2.0 g/10 min; and/or (iii) from greater than 50 wt %, or 55 wt %, or 60 wt %, or 65 wt % to 70 wt %, or 75 wt %, or 80 wt %, or 85 wt %, or 90 wt %, or 95 wt %, or 97 wt %, or 99 wt %, or 100 wt % units derived from ethylene and a reciprocal amount, or from 0 wt %, or 1 wt %, or 3 wt %, or 5 wt %, or 10 wt %, or 15 wt %, or 20 wt %, or 25 wt %, or 30 wt % to 35 wt %, or 40 wt %, or 45 wt %, or less than 50 wt % units derived from a comonomer, based on the total weight of the HDPE.

In an embodiment, the HDPE has at least 2, or all 3 of properties (i)-(iii).

In an embodiment, the HDPE is an ethylene homopolymer. In another embodiment, the HDPE is an ethylene homopolymer with a density of 0.962 g/cc and a melt index of 0.85 g/10 min. In a further embodiment, the HDPE is ELITE™ 5960G, available from The Dow Chemical Company.

In an embodiment, the core layer contains from 80 wt %, or 85 wt %, or 90 wt %, or 95 wt % to 97 wt %, or 98 wt %, or 99 wt %, or 100 wt % of the HDPE, based on the total weight of the core layer.

In an embodiment, the core layer includes an optional additive. Nonlimiting examples of suitable additives include antioxidants, antistatic agents, stabilizing agents, nucleating agents, colorants, ultra violet (UV) absorbers or stabilizers, flame retardants, compatibilizers, plasticizers, fillers, processing aids, crosslinking agents (e.g., peroxides), and combinations thereof.

In an embodiment, the core layer excludes an antiblocking agent and/or a slip agent.

In an embodiment, the core layer contains from 80 wt %, or 85 wt %, or 90 wt %, or 95 wt % to 97 wt %, or 98 wt %, or 99 wt %, or 100 wt % of the HDPE, and from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt % additive, based on the total weight of the core layer.

In an embodiment, the core layer consists essentially of, or consists of, from 80 wt %, or 85 wt %, or 90 wt %, or 95 wt % to 97 wt %, or 98 wt %, or 99 wt %, or 100 wt % of the HDPE, and from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt % additive, based on the total weight of the core layer.

The HDPE may be the sole polymeric component in the core layer, or the HDPE may be present in a blend with one or more polymeric components in combination with the HDPE. A nonlimiting example of a suitable polymeric component is a polyolefin, such as an ethylene-based polymer or a propylene-based polymer. The optional polyolefin is different than the HDPE. However, it is understood that the core layer may include a blend of two or more different HDPE. In an embodiment, the core layer excludes an optional polyolefin. In another embodiment, the core layer excludes propylene-based polymers.

The core layer has two opposing surfaces. In an embodiment, the core layer is a continuous layer with two opposing surfaces.

In an embodiment, the core layer has a thickness of from 6.0 μm, or 7.0 μm, or 8.0 μm, or 9.0 μm, or 10.0 μm, or 11.0 μm, or 12.0 μm, or 13.0 μm, or 14.0 μm, or 15.0 μm, or 16.0 μm, or 17.0 μm, or 18.0 μm, or 19.0 μm, or 19.8 μm to 22.2 μm, or 23.0 μm, or 25 μm, or 30 μm, or 35 μm, or 40 μm, or 45 μm, or 50 μm, or 65 μm, or 70 μm, or 75 μm, or 80 μm, or 85 μm, or 90 μm.

The core layer may comprise two or more embodiments disclosed herein.

B. Skin Layers

The multilayer film contains skin layers on opposite sides of the core layer. Each skin layer includes (i) a propylene/ethylene copolymer with from greater than 0 wt % to 5 wt % units derived from ethylene comonomer; (ii) from 3,000 to 3,500 ppm of a slip agent; (iii) from 4,000 to 10,000 ppm of an antiblock agent; and, optionally, (iv) an additive.

In an embodiment, each skin layer consists essentially of, or consists of, (i) a propylene/ethylene copolymer with from greater than 0 wt % to 5 wt % units derived from ethylene comonomer; (ii) from 3,000 to 3,500 ppm of a slip agent; (iii) from 4,000 to 10,000 ppm of an antiblock agent; and, optionally, (iv) an additive.

In an embodiment, each skin layer has a thickness of from 0.75 μm, or 1.0 μm, or 1.5 μm, or 2.0 μm, or 3.0 μm, or 4.0 μm, or 5.0 μm, or 6.0 μm, or 6.5 μm to 7.0 μm, or 7.5 μm, or 8.0 μm, or 9.0 μm, or 10.0 μm, or 11.0 μm, or 12.0 μm, or 13.0 μm, or 14.0 μm, or 15.0 μm, or 20.0 μm, or 25.0 μm, or 30 μm. Each skin layer may have the same thickness or a different thickness.

The skin layers may comprise two or more embodiments disclosed herein.

i. Propylene/Ethylene Copolymer

Each skin layer contains a propylene/ethylene copolymer. The propylene/ethylene copolymer contains from greater than 0 wt % to 5 wt % units derived from ethylene comonomer.

In an embodiment, the propylene/ethylene copolymer is a propylene-based plastomer or elastomer. A nonlimiting example of a suitable propylene/ethylene copolymer that is a propylene-based plastomer or elastomer is VERSIFY™ 3000, available from The Dow Chemical Company.

In an embodiment, the propylene/ethylene copolymer includes from less than 100 wt %, or 99 wt %, or 98 wt % to 97 wt %, or 96 wt %, or 95 wt % units derived from propylene and a reciprocal amount, or from greater than 0 wt %, or 1 wt %, or 2 wt % to 3 wt %, or 4 wt %, or 5 wt % units derived from ethylene, based on the total weight of the propylene/ethylene copolymer.

In an embodiment, the propylene/ethylene copolymer has a density from 0.880 g/cc, or 0.885 g/cc, or 0.888 g/cc to 0.890 g/cc, or 0.891 g/cc, or 0.895 g/cc, or 0.900 g/cc, or 0.905 g/cc.

In an embodiment, the propylene/ethylene copolymer has a melt flow rate (MFR) from 2.0 g/10 min, or 3.0 g/10 min, or 4.0 g/10 min to 5.0 g/10 min, or 6.0 g/10 min, or 7.0 g/10 min, or 8.0 g/10 min, or 9.0 g/10 min, or 10.0 g/10 min, or 15.0 g/10 min, or 20.0 g/10 min, or 25.0 g/10 min. In an embodiment, the propylene/ethylene copolymer has a melt flow rate (MFR) from greater than 2.0 g/10 min to 25 g/10 min, or from greater than 2.0 g/10 min to 15.0 g/10 min.

In an embodiment, the propylene/ethylene copolymer has a total unsaturation per mole of propylene from 0.01%, or 0.015% to 0.025%, or 0.03%. The total unsaturation per mole of propylene is measured by $^1$H NMR analysis, as described above in the test methods section.

In an embodiment, the propylene/ethylene copolymer has a crystallinity from 1 wt %, or 10 wt %, or 15 wt %, or 20 wt %, or 25 wt %, or 30 wt % to 35 wt %, or 40 wt %, or 45 wt %, or 50 wt %, or 55 wt %, or 60 wt %, or 65 wt %, or 70 wt %. In an embodiment, the propylene/ethylene copolymer has a crystallinity from 30 wt % to 70 wt %, or from 40 wt % to 60 wt %, or from 10 wt % to 40 wt %, or from 20 wt % to 39 wt %.

In an embodiment, the propylene/ethylene copolymer has a melting temperature, Tm, from 90° C., or 100° C., or 105° C. to 110° C., or 120° C., or 140° C., or 150° C., or 160° C., or 170° C.

In an embodiment, the propylene/ethylene copolymer has a weight average molecular weight (Mw) from 20,000 g/mol, or 24,000 g/mol, or 30,000 g/mol to 40,000 g/mol, or 48,000 g/mol, or 50,000 g/mol.

In an embodiment, the propylene/ethylene copolymer has a Mw/Mn from 2.0, or 2.5 to 3.5, or 4.0.

The term "B-value" is a measure of randomness and measures the distribution of the propylene and ethylene comonomer across the polymer chain of the propylene/ethylene copolymer. B-values range from 0 to 2. The higher the B-value, the more alternating the ethylene distribution in the propylene/ethylene copolymer. The lower the B-value, the more blocky or clustered the ethylene distribution in the propylene/ethylene copolymer. In an embodiment, the propylene/ethylene copolymer has a B-value of less than 1.0, or less than 0.99, or less than 0.98, or less than 0.97. In an embodiment, the propylene/ethylene copolymer has a B-value from 0.90, or 0.92, or 0.93, or 0.94 to 0.95, or 0.96, or 0.97, or 0.98, or 0.99.

The B-value as described by Koenig (Spectroscopy of Polymers (2d ed. 1999) is calculated as follows. B is defined for the propylene/ethylene copolymer as:

$$B = \frac{f(EP + PE)}{2 \cdot F_E \cdot F_P},$$

where f(EP+PE)=the sum of the EP and PE diad fractions; and Fe and Fp=the mole fraction of ethylene and propylene in the copolymer, respectively. The diad fraction can be derived from triad data according to: f(EP+PE)=[EPE]+[EPP+PPE]/2+[PEP]+[EEP+PEE]/2.

In an embodiment, propylene/ethylene copolymer is characterized as having substantially isotactic propylene sequences. "Substantially isotactic propylene sequences" are sequences having an isotactic triad (mm) measured by $^{13}C$ NMR of greater than 0.85, or greater than 0.90, or greater than 0.92, or greater than 0.93. Isotactic triads refer to the isotactic sequence in terms of a triad unit in the copolymer molecular chain determined by $^{13}C$ NMR spectroscopy.

In an embodiment, the propylene/ethylene copolymer has one, some, or all of the following properties:

(i) a density from 0.880 g/cc, or 0.885 g/cc, or 0.888 g/cc to 0.890 g/cc, or 0.891 g/cc, or 0.895 g/cc, or 0.900 g/cc, or 0.905 g/cc; and/or (ii) a melt flow rate (MFR) from 2.0 g/10 min, or 3.0 g/10 min, or 4.0 g/10 min to 5.0 g/10 min, or 6.0 g/10 min, or 7.0 g/10 min, or 8.0 g/10 min, or 9.0 g/10 min, or 10.0 g/10 min, of 15.0 g/10 min, or 20.0 g/10 min, or 25.0 g/10 min; and/or (iii) from less than 100 wt %, or 99 wt %, or 98 wt % to 97 wt %, or 96 wt %, or 95 wt % units derived from propylene and a reciprocal amount, or from greater than 0 wt %, or 1 wt %, or 2 wt % to 3 wt %, or 4 wt %, or 5 wt % units derived from ethylene, based on the total weight of the propylene/ethylene copolymer; and/or (iv) a total unsaturation per mole of propylene from 0.01%, or 0.015% to 0.025%, or 0.03%; and/or (v) a crystallinity from 1 wt %, or 10 wt %, or 15 wt %, or 20 wt %, or 25 wt %, or 30 wt % to 35 wt %, or 40 wt %, or 45 wt %, or 50 wt %, or 55 wt %, or 60 wt %, or 65 wt %, or 70 wt %; and/or (vi) a melting temperature, Tm, from 90° C., or 100° C., or 105° C. to 110° C., or 120° C., or 140° C., or 150° C., or 160° C., or 170° C.; and/or (vii) a weight average molecular weight (Mw) from 20,000 g/mol, or 24,000 g/mol, or 30,000 g/mol to 40,000 g/mol, or 48,000 g/mol, or 50,000 g/mol; and/or (viii) a Mw/Mn from 2.0, or 2.5 to 3.5, or 4.0; and/or (ix) a B-value from 0.90, or 0.92, or 0.93, or 0.94 to 0.95, or 0.96, or 0.97, or 0.98, or 0.99; and/or (x) sequences having an isotactic triad (mm) measured by $^{13}C$ NMR of greater than 0.85.

In an embodiment, the propylene/ethylene copolymer has at least 2, or at least 3, or at least 4, or at least 5, or at least 6, or at least 7, or at least 8, or at least 9, or all 10 of properties (i)-(x).

In an embodiment, the propylene/ethylene copolymer has a density of 0.891 g/cc and a melt flow rate (MFR) of 8.0 g/10 min. In a further embodiment, the propylene/ethylene copolymer is VERSIFY™ 3000, available from The Dow Chemical Company.

In an embodiment, each skin layer contains from 70 wt %, or 75 wt %, or 77 wt % to 80 wt %, or 83 wt %, or 85 wt %, or 90 wt %, or 95 wt %, or 96 wt %, or 97 wt %, or 98 wt %, or 99 wt %, or 99.3 wt %, or less than 100 wt % propylene/ethylene copolymer, based on the total weight of each skin layer.

The propylene/ethylene copolymer may comprise two or more embodiments disclosed herein.

ii. Slip Agent

Each skin layer contains a slip agent. A "slip agent" is a compound that has a coefficient of friction (COF) from 0.02 to 0.15. In an embodiment, the slip agent has a COF of from 0.02, or 0.04, or 0.06, or 0.07, or 0.08, or 0.09, or 0.10 to 0.15.

Nonlimiting examples of suitable slip agents include fatty acid amides, silicone, plasticizers, organic amines, dibasic esters, stearates, sulfates, fatty acids, mineral oil, vegetable oils, fluorinated organic resins, graphite, tungsten disulfide, molybdenum disulfide, and combinations thereof.

In an embodiment, the slip agent is a fatty acid amide. A "fatty acid amide" is a molecule having the Structure (I):

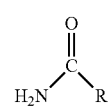

Structure (I)

wherein R is a $C_3$ to $C_{27}$ alkyl moiety. In an embodiment, R is a $C_{11}$ to $C_{25}$, or a $C_{15}$ to $C_{23}$ alkyl moiety. In another embodiment, R is a $C_{21}$ alkyl moiety. R can be saturated, mono-unsaturated, or poly-unsaturated. In an embodiment, R is mono-unsaturated. Nonlimiting examples of suitable fatty acid amides include erucamide, oleamide, palmitamide, stearamide, and behenamide. Additionally, the fatty acid amide can be a mixture of two or more fatty acid amides. In an embodiment, the fatty acid amide is erucamide.

In an embodiment, the slip agent is a silicone. A "silicone" is a polymer generally comprising siloxane-based monomer residue repeating units. A "siloxane" is a monomer residue repeat unit having the Structure (II):

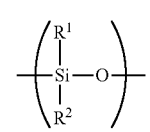

Structure (II)

wherein $R^1$ and $R^2$ each independently is hydrogen or a hydrocarbyl group. A "hydrocarbyl group" is a univalent group formed by removing a hydrogen atom from a hydrocarbon (e.g., alkyl groups, such as ethyl, or aryl groups, such as phenyl). The siloxane monomer residue can be any dialkyl, diaryl, dialkaryl, or diaralkyl siloxane, having the same or differing alkyl, aryl, alkaryl, or aralkyl moieties. In an embodiment, each of $R^1$ and $R^2$ is independently a $C_1$ to $C_{20}$, or $C_1$ to $C_{12}$, or $C_1$ to $C_6$ alkyl, aryl, alkaryl, or aralkyl moiety. $R^1$ and $R^2$ can have the same or a different number of carbon atoms. In an embodiment, the hydrocarbyl group for each of $R^1$ and $R^2$ is an alkyl group that is saturated and optionally straight-chain. The alkyl group can be the same or can be different for each of $R^1$ and $R^2$. Non-limiting examples of alkyl groups suitable for use in $R^1$ and $R^2$ include methyl, ethyl, 1-propyl, 2-propyl, 1-butyl, isobutyl, t-butyl, or combinations of two or more thereof. Nonlimiting examples of suitable silicone include polydimethylsiloxane (PDMS), poly(ethyl-methylsiloxane), and combinations thereof.

In an embodiment, the slip agent is selected from a fatty acid amide, a silicone, and combinations thereof. In another embodiment, the slip agent is selected from erucamide, oleamide, palmitamide, stearamide, behenamide, PDMS, and combinations thereof.

In an embodiment, the slip agent excludes silicones. In a further embodiment, the slip agent excludes polydimethylsiloxane (PDMS).

In an embodiment, the slip agent is a stearate. Nonlimiting examples of suitable stearates include zinc stearate, lead stearate, calcium stearate, and combinations thereof.

In an embodiment, the slip agent is a sulfate. A nonlimiting example of a suitable sulfate is zinc sulfate.

In an embodiment, the slip agent is a fatty acid. Nonlimiting examples of suitable fatty acids include palmitic acid, stearic acid, and combinations thereof.

In an embodiment, the slip agent is a fluorinated organic resin. A "fluorinated organic resin" is a polymer of one or more fluorinated monomers selected from tetrafloroethylene, vinylidene fluoride, and chlorotrifluoroethylene.

In an embodiment, each skin layer contains from 3,000 ppm, or 3,100 ppm, or 3,200 ppm to 3,300 ppm, or 3,400 ppm, or 3,500 ppm slip agent.

In an embodiment, each skin layer contains from 0.30 wt %, or 0.31 wt %, or 0.32 wt % to 0.33 wt %, or 0.34 wt %, or 0.35 wt % slip agent, based on the total weight of each skin layer.

The slip agent may comprise two or more embodiments disclosed herein.

iii. Antiblock Agent

Each skin layer contains an antiblock agent. An "antiblock agent" is a compound that minimizes, or prevents, blocking (i.e., adhesion) between two adjacent layers of film by creating a microscopic roughening of the film layer surface, which reduces the available contact area between adjacent layers.

Nonlimiting examples of suitable antiblock agents include silica, talc, calcium carbonate, and combinations thereof. In an embodiment, the antiblock agent is silica ($SiO_2$). The silica may be organic silica or synthetic silica.

In an embodiment, each skin layer contains from 4,000 ppm, or 4,500 ppm, or 5,000 ppm, or 5,500 ppm, or 6,000 ppm to 6,500 ppm, or 7,000 ppm, or 7,500 ppm, or 8,000 ppm, or 8,500 ppm, or 9,000 ppm, or 9,500 ppm, or 10,000 ppm antiblock agent.

In an embodiment, each skin layer contains from 0.40 wt %, or 0.45 wt %, or 0.50 wt %, or 0.55 wt %, or 0.60 wt % to 0.65 wt %, or 0.70 wt %, or 0.75 wt %, or 0.80 wt %, or 0.85 wt %, or 0.90 wt %, or 0.95 wt %, or 1.00 wt % antiblock agent, based on the total weight of each respective skin layer.

The antiblock agent may comprise two or more embodiments disclosed herein.

iv. Optional Additives

In an embodiment, each skin layer includes an optional additive. The optional additive may be any additive disclosed herein. In an embodiment, each skin layer contains an additive selected from antioxidants, antistatic agents, stabilizing agents, nucleating agents, colorants, ultra violet (UV) absorbers or stabilizers, flame retardants, compatibilizers, plasticizers, fillers, processing aids, crosslinking agents (e.g., peroxides), and combinations thereof.

In an embodiment, each skin layer contains from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt % additive, based on the total weight of each skin layer.

The propylene/ethylene copolymer may be the sole polymeric component in each skin layer, or the propylene/ethylene copolymer may be present in a blend with one or more polymeric components in combination with the propylene/ethylene copolymer. A nonlimiting example of a suitable polymeric component is a polyolefin, such as an ethylene-based polymer or a propylene-based polymer. The optional polyolefin is different than the propylene/ethylene copolymer. However, it is understood that each skin layer may include a blend of two or more different propylene/ethylene copolymers. In an embodiment, each skin layer excludes an optional polyolefin. In another embodiment, each skin layer excludes ethylene-based polymers. In an embodiment, each skin layer includes from 15 wt %, or 16 wt % to 18 wt %, or 20 wt %, or 22 wt %, or 25 wt %, or 30 wt % ethylene-based polymer, based on the total weight of each skin layer.

In an embodiment, each skin layer contains:

(i) from 70 wt %, or 75 wt %, or 77 wt % to 80 wt %, or 83 wt %, or 85 wt %, or 90 wt %, or 95 wt %, or 96 wt %, or 97 wt %, or 98 wt %, or 99 wt %, or 99.3 wt % propylene/ethylene copolymer, the propylene/ethylene copolymer having one, some, or all of the following properties:

(a) a density from 0.880 g/cc, or 0.885 g/cc, or 0.888 g/cc to 0.890 g/cc, or 0.891 g/cc, or 0.895 g/cc, or 0.900 g/cc, or 0.905 g/cc; and/or (b) a melt flow rate (MFR) from 2.0 g/10 min, or 3.0 g/10 min, or 4.0 g/10 min to 5.0 g/10 min, or 6.0 g/10 min, or 7.0 g/10 min, or 8.0 g/10 min, or 9.0 g/10 min, or 10.0 g/10 min, of 15.0 g/10 min, or 20.0 g/10 min, or 25.0 g/10 min; and/or (c) from less than 100 wt %, or 99 wt %, or 98 wt % to 97 wt %, or 96 wt %, or 95 wt % units derived from propylene and a reciprocal amount, or from greater than 0 wt %, or 1 wt %, or 2 wt % to 3 wt %, or 4 wt %, or 5 wt % units derived from ethylene, based on the total weight of the propylene/ethylene copolymer; and/or (d) a total unsaturation per mole of propylene from 0.01%, or 0.015% to 0.025%, or 0.03%; and/or (e) a crystallinity from 1 wt %, or 10 wt %, or 15 wt %, or 20 wt %, or 25 wt %, or 30 wt % to 35 wt %, or 40 wt %, or 45 wt %, or 50 wt %, or 55 wt %, or 60 wt %, or 65 wt %, or 70 wt %; and/or (f) a melting temperature, Tm, from 90° C., or 100° C., or 105° C. to 110° C., or 120° C., or 140° C., or 150° C., or 160° C., or 170° C.; and/or (g) a weight average molecular weight (Mw) from 20,000 g/mol, or 24,000 g/mol, or 30,000 g/mol to 40,000 g/mol, or 48,000 g/mol, or 50,000 g/mol; and/or (h) a Mw/Mn from 2.0, or 2.5 to 3.5, or 4.0; and/or (i) a B-value from 0.90, or 0.92, or 0.93, or 0.94 to 0.95, or 0.96, or 0.97, or 0.98, or 0.99; and/or (j) sequences having an isotactic triad (mm) measured by $^{13}C$ NMR of greater than 0.85;

(ii) from 3,000 ppm, or 3,100 ppm, or 3,200 ppm to 3,300 ppm, or 3,400 ppm, or 3,500 ppm slip agent, such as a fatty acid amide (e.g., erucamide);

(iii) from 4,000 ppm, or 4,500 ppm, or 5,000 ppm, or 5,500 ppm, or 6,000 ppm to 6,500 ppm, or 7,000 ppm, or 7,500 ppm, or 8,000 ppm, or 8,500 ppm, or 9,000 ppm, or 9,500 ppm, or 10,000 ppm antiblock agent such as silica;

(iv) from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt % additive; and (v) from 0 wt %, or 15 wt %, or 16 wt % to 18 wt %, or 20 wt %, or 22 wt %, or 25 wt %, or 30 wt % ethylene-based polymer, based on the total weight of each skin layer; and each skin layer has a thickness of from 0.75 μm, or 1.0 μm, or 1.5 μm, or 2.0 μm, or 3.0 μm, or 4.0 μm, or 5.0 μm, or 6.0 μm, or 6.5 μm to 7.0 μm, or 7.5 μm, or 8.0 μm, or 9.0 μm, or 10.0 μm, or 11.0 μm, or 12.0 μm, or 13.0 μm, or 14.0 μm, or 15.0 μm, or 20.0 μm, or 25.0 μm, or 30 μm.

In an embodiment, each skin layer contains:

(i) from 70 wt %, or 75 wt %, or 77 wt % to 80 wt %, or 83 wt %, or 85 wt %, or 90 wt %, or 95 wt %, or 96 wt %, or 97 wt %, or 98 wt %, or 99 wt %, or 99.3 wt % propylene/ethylene copolymer, the propylene/ethylene copolymer having one, some, or all of the following properties:

(a) a density from 0.880 g/cc, or 0.885 g/cc, or 0.888 g/cc to 0.890 g/cc, or 0.891 g/cc, or 0.895 g/cc, or 0.900 g/cc, or 0.905 g/cc; and/or (b) a melt flow rate (MFR) from 2.0 g/10 min, or 3.0 g/10 min, or 4.0 g/10 min to 5.0 g/10 min, or 6.0 g/10 min, or 7.0 g/10 min, or 8.0 g/10 min, or 9.0 g/10 min, or 10.0 g/10 min, of 15.0 g/10 min, or 20.0 g/10 min, or 25.0 g/10 min; and/or (c) from less than 100 wt %, or 99 wt %, or 98 wt % to 97 wt %, or 96 wt %, or 95 wt % units derived from propylene and a reciprocal amount, or from greater than 0 wt %, or 1 wt %, or 2 wt % to 3 wt %, or 4 wt %, or 5 wt % units derived from ethylene, based on the total weight of the propylene/ethylene copolymer; and/or (d) a total unsaturation per mole of propylene from 0.01%, or 0.015% to 0.025%, or 0.03%; and/or (e) a crystallinity from 1 wt %, or 10 wt %, or 15 wt %, or 20 wt %, or 25 wt %, or 30 wt % to 35 wt %, or 40 wt %, or 45 wt %, or 50 wt %, or 55 wt %, or 60 wt %, or 65 wt %, or 70 wt %; and/or (f) a melting temperature, Tm, from 90° C., or 100° C., or 105° C. to 110° C., or 120° C., or 140° C., or 150° C., or 160° C., or 170° C.; and/or (g) a weight average molecular weight (Mw) from 20,000 g/mol, or 24,000 g/mol, or 30,000 g/mol to 40,000 g/mol, or 48,000 g/mol, or 50,000 g/mol; and/or (h) a Mw/Mn from 2.0, or 2.5 to 3.5, or 4.0; and/or (i) a B-value from 0.90, or 0.92, or 0.93, or 0.94 to 0.95, or 0.96, or 0.97, or 0.98, or 0.99; and/or (j) sequences having an isotactic triad (mm) measured by $^{13}$C NMR of greater than 0.85;

(ii) from 0.30 wt %, or 0.31 wt %, or 0.32 wt % to 0.33 wt %, or 0.34 wt %, or 0.35 wt % slip agent, such as a fatty acid amide (e.g., erucamide);

(iii) from 0.40 wt %, or 0.45 wt %, or 0.50 wt %, or 0.55 wt %, or 0.60 wt % to 0.65 wt %, or 0.70 wt %, or 0.75 wt %, or 0.80 wt %, or 0.85 wt %, or 0.90 wt %, or 0.95 wt %, or 1.00 wt % antiblock agent, such as silica;

(iv) from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt % additive; and (v) from 0 wt %, or 15 wt %, or 16 wt % to 18 wt %, or 20 wt %, or 22 wt %, or 25 wt %, or 30 wt % ethylene-based polymer, based on the total weight of each skin layer; and each skin layer has a thickness of from 0.75 μm, or 1.0 μm, or 1.5 μm, or 2.0 μm, or 3.0 μm, or 4.0 μm, or 5.0 μm, or 6.0 μm, or 6.5 μm to 7.0 μm, or 7.5 μm, or 8.0 μm, or 9.0 μm, or 10.0 μm, or 11.0 μm, or 12.0 μm, or 13.0 μm, or 14.0 μm, or 15.0 μm, or 20.0 μm, or 25.0 μm, or 30 μm.

It is understood that the sum of the components in each of the skin layers disclosed herein, including the foregoing layers, yields 100 weight percent (wt %), based on the total weight of the respective skin layer.

Each skin layer may have the same or a different composition. In an embodiment, each skin layer has the same composition.

Each skin layer has two opposing surfaces. In an embodiment, each skin layer is a continuous layer with two opposing surfaces.

The skin layers may comprise two or more embodiments disclosed herein.

C. Multilayer Film

The multilayer film contains at least three layers including (A) a core layer containing a high density polyethylene (HDPE) having a density from 0.940 g/cc to 0.980 g/cc and, optionally, an additive; and (B) skin layers on opposite sides of the core layer. Each skin layer includes (i) a propylene/ethylene copolymer with from greater than 0 wt % to 5 wt % units derived from ethylene comonomer; (ii) from 3,000 to 3,500 ppm of a slip agent; (iii) from 4,000 to 10,000 ppm of an antiblock agent; and, optionally, (iv) an additive. The core layer and the skin layers may be any core layer and skin layer disclosed herein.

The multilayer film contains three layers, or more than three layers. For example, the multilayer film can have three, four, five, six, seven, eight, nine, ten, eleven, or more layers. In an embodiment, the multilayer film contains only three layers.

In an embodiment, the multilayer film consists essentially of, or consists of, at least three layers including (A) the core layer containing HDPE having a density from 0.940 g/cc to 0.980 g/cc and, optionally, an additive; and (B) skin layers on opposite sides of the core layer. Each skin layer includes (i) the propylene/ethylene copolymer with from greater than 0 wt % to 5 wt % units derived from ethylene comonomer; (ii) from 3,000 to 3,500 ppm of the slip agent; (iii) from 4,000 to 10,000 ppm of the antiblock agent; and, optionally, (iv) an additive.

The skin layers may be in direct contact or in indirect contact with the core layer. In an embodiment, the skin layers directly contact the core layer. The term "directly contacts," as used herein, is a layer configuration whereby the core layer is located immediately adjacent to each skin layer and no intervening layers, or no intervening structures, are present between the core layer and each skin layer. In another embodiment, the skin layers indirectly contact the core layer. The term "indirectly contacts," as used herein, is a layer configuration whereby an intervening layer, or an intervening structure, is present between the core layer and each skin layer.

In an embodiment, the multilayer film has a thickness of from 15 μm, or 20 μm, or 25 μm, or 30 μm, or 33 μm to 37 μm, or 40 μm, or 45 μm, or 50 μm, or 55 μm, or 60 μm, or 65 μm, or 70 μm, or 75 μm, or 80 μm, or 85 μm, or 90 μm, or 95 μm, or 100 μm.

In an embodiment, the core layer is from 40 vol %, or 45 vol %, or 50 vol %, or 55 vol % to 60 vol %, or 65 vol %, or 70 vol %, or 75 vol %, or 80 vol %, or 85 vol %, or 90 vol % of the total volume of the multilayer film.

In an embodiment, the combined volume of the skin layers is from 10 vol %, or 15 vol %, or 20 vol %, or 25 vol %, or 30 vol %, or 35 vol %, or 40 vol % to 45 vol %, or 50 vol %, or 55 vol %, or 60 vol % of the total volume of the multilayer film. In an embodiment, the volume of each individual skin layer is from 5 vol %, or 7.5 vol %, or 10 vol %, or 12.5 vol %, or 15 vol %, or 20 vol % to 22.5 vol %, or 25 vol %, or 27.5 vol %, or 30 vol % of the total volume of the multilayer film.

In an embodiment, the core layer has a thickness of from 6.0 µm, or 7.0 µm, or 8.0 µm, or 9.0 µm, or 10.0 µm, or 11.0 µm, or 12.0 µm, or 13.0 µm, or 14.0 µm, or 15.0 µm, or 16.0 µm, or 17.0 µm, or 18.0 µm, or 19.0 µm, or 19.8 µm to 22.2 µm, or 23.0 µm, or 25 µm, or 30 µm, or 35 µm, or 40 µm, or 45 µm, or 50 µm, or 65 µm, or 70 µm, or 75 µm, or 80 µm, or 85 µm, or 90 µm; and each skin layer has a thickness of from 0.75 µm, or 1.0 µm, or 1.5 µm, or 2.0 µm, or 3.0 µm, or 4.0 µm, or 5.0 µm, or 6.0 µm, or 6.5 µm to 7.0 µm, or 7.5 µm, or 8.0 µm, or 9.0 µm, or 10.0 µm, or 11.0 µm, or 12.0 µm, or 13.0 µm, or 14.0 µm, or 15.0 µm, or 20.0 µm, or 25.0 µm, or 30 µm.

In an embodiment, the multilayer film has a slip factor of from 30,000, or 35,000, or 39,000 to 40,000, or 45,000, or 50,000, or 52,000, or 55,000, or 60,000. The "slip factor" of the multilayer film is calculated in accordance with the following Equation (I):

$$\text{slip factor} = \text{thickness of film} \times \left(\left(\left(\frac{\text{wt \% skin layer 1}}{100}\right) \times \text{total ppm of slip agent in skin layer 1}\right) + \left(\left(\frac{\text{wt \% core layer}}{100}\right) \times \text{total ppm of slip agent in core layer}\right) + \left(\left(\frac{\text{wt \% skin layer 2}}{100}\right) \times \text{total ppm of slip agent in skin layer 2}\right)\right) \quad \text{Equation (I)}$$

In Equation (I), the weight percent ("wt %") of each respective layer is based on the total weight of the film.

In an embodiment, the multilayer film has a coefficient of friction (COF) from 0.05, or 0.10, or 0.15, or 0.19, or 0.20, or 0.24 to 0.25, or 0.26, or 0.27, or 0.28, or 0.29, or 0.30, or 0.31, or 0.32, or 0.33, or 0.34, or 0.35.

In an embodiment, the multilayer film has a twist retention after aging 7 days of from 66%, or 70% to 75%, or 80%, or 85%, or 90%, or 95%, or 100%. A higher twist retention after aging 7 days (≥66%) indicates the multilayer film maintains a folded/twisted formation after aging. Consequently, the present multilayer film is suitable for twist packaging.

In an embodiment, the multilayer film has a yield tension from 5 MPa, or 8 MPa, or 10 MPa, or 13 MPa to 14 MPa, or 15 MPa, or 16 MPa. During folding and/or twisting of the multilayer film, tension is applied to the multilayer film and the film elongates and recovers to its original dimensions when the tension is removed, until the tension that is applied is the "yield tension," at which point the multilayer film elongates but deformation is permanent (indicating the multilayer film maintains its folded/twisted formation). A low yield tension of from 5 MPa to 16 MPa is advantageous because it enables permanent deformation of the multilayer film and fold/twist retention with a lower tension applied to the multilayer film.

In an embodiment, the multilayer film has at least three layers including:
(A) a core layer containing from 80 wt %, or 85 wt %, or 90 wt %, or 95 wt % to 97 wt %, or 98 wt %, or 99 wt %, or 100 wt % HDPE, and from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt % additive, based on the total weight of the core layer, the HDPE having one, some, or all of the following properties:
(i) a density 0.940 g/cc, or 0.945 g/cc, or 0.950 g/cc, or 0.955 g/cc, or 0.958 g/cc to 0.960 g/cc, or 0.962 g/cc, or 0.965 g/cc, or 0.970 g/cc, or 0.975 g/cc, or 0.980 g/cc; and/or
(i) a melt index (MI) of 0.1 g/10 min, or 0.5 g/10 min to 1.0 g/10 min, or 1.5 g/10 min, or 2.0 g/10 min; and/or
(iii) from greater than 50 wt %, or 55 wt %, or 60 wt %, or 65 wt % to 70 wt %, or 75 wt %, or 80 wt %, or 85 wt %, or 90 wt %, or 95 wt %, or 97 wt %, or 99 wt %, or 100 wt % units derived from ethylene and a reciprocal amount, or from 0 wt %, or 1 wt %, or 3 wt %, or 5 wt %, or 10 wt %, or 15 wt %, or 20 wt %, or 25 wt %, or 30 wt % to 35 wt %, or 40 wt %, or 45 wt %, or less than 50 wt % units derived from a comonomer, based on the total weight of the HDPE;
(B) skin layers on opposite sides of the core layer, each skin layer containing:
(i) from 70 wt %, or 75 wt %, or 77 wt % to 80 wt %, or 83 wt %, or 85 wt %, or 90 wt %, or 95 wt %, or 96 wt %, or 97 wt %, or 98 wt %, or 99 wt %, or 99.3 wt % propylene/ethylene copolymer, the propylene/ethylene copolymer having one, some, or all of the following properties:
(a) a density from 0.880 g/cc, or 0.885 g/cc, or 0.888 g/cc to 0.890 g/cc, or 0.891 g/cc, or 0.895 g/cc, or 0.900 g/cc, or 0.905 g/cc; and/or
(b) a melt flow rate (MFR) from 2.0 g/10 min, or 3.0 g/10 min, or 4.0 g/10 min to 5.0 g/10 min, or 6.0 g/10 min, or 7.0 g/10 min, or 8.0 g/10 min, or 9.0 g/10 min, or 10.0 g/10 min, of 15.0 g/10 min, or 20.0 g/10 min, or 25.0 g/10 min; and/or
(c) from less than 100 wt %, or 99 wt %, or 98 wt % to 97 wt %, or 96 wt %, or 95 wt % units derived from propylene and a reciprocal amount, or from greater than 0 wt %, or 1 wt %, or 2 wt % to 3 wt %, or 4 wt %, or 5 wt % units derived from ethylene, based on the total weight of the propylene/ethylene copolymer;
(ii) from 0.30 wt %, or 0.31 wt %, or 0.32 wt % to 0.33 wt %, or 0.34 wt %, or 0.35 wt % slip agent, such as a fatty acid amide (e.g., erucamide);
(iii) from 0.40 wt %, or 0.45 wt %, or 0.50 wt %, or 0.55 wt %, or 0.60 wt % to 0.65 wt %, or 0.70 wt %, or 0.75 wt %, or 0.80 wt %, or 0.85 wt %, or 0.90 wt %, or 0.95 wt %, or 1.00 wt % antiblock agent, such as silica;
(iv) from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt % additive; and
(v) from 0 wt %, or 15 wt %, or 16 wt % to 18 wt %, or 20 wt %, or 22 wt %, or 25 wt %, or 30 wt % ethylene-based polymer, based on the total weight of each skin layer;
and the multilayer film has one, some, or all of the following properties:
(1) a total thickness of from 15 µm, or 20 µm, or 25 µm, or 30 µm, or 33 µm to 37 µm, or 40 µm, or 45 µm, or 50 µm, or 55 µm, or 60 µm, or 65 µm, or 70 µm, or 75 µm, or 80 µm, or 85 µm, or 90 µm, or 95 µm, or 100 µm; and/or
(2) the core layer is from 40 vol %, or 45 vol %, or 50 vol %, or 55 vol % to 60 vol %, or 65 vol %, or 70 vol %, or 75 vol %, or 80 vol %, or 85 vol %, or 90 vol % of the total volume of the multilayer film; and/or
(3) the core layer has a thickness of from 6.0 µm, or 7.0 µm, or 8.0 µm, or 9.0 µm, or 10.0 µm, or 11.0 µm, or 12.0 µm, or 13.0 µm, or 14.0 µm, or 15.0 µm, or 16.0 µm, or 17.0 µm, or 18.0 µm, or 19.0 µm, or 19.8 µm to 22.2 µm, or 23.0 µm, or 25 µm, or 30 µm, or 35 µm, or 40 µm, or 45 µm, or 50 µm, or 65 µm, or 70 µm, or 75 µm, or 80 µm, or 85 µm, or 90 µm; and/or
(4) the combined volume of the skin layers is from 10 vol %, or 15 vol %, or 20 vol %, or 25 vol %, or 30 vol %, or 35 vol %, or 40 vol % to 45 vol %, or 50 vol %, or 55 vol %, or 60 vol % of the total volume of the multilayer film; and/or
(5) each skin layer has a thickness of from 0.75 µm, or 1.0 µm, or 1.5 µm, or 2.0 µm, or 3.0 µm, or 4.0 µm, or 5.0 µm, or 6.0 µm, or 6.5 µm to 7.0 µm, or 7.5 µm, or 8.0 µm, or 9.0 µm, or 10.0 µm, or 11.0 µm, or 12.0 µm, or 13.0 µm, or 14.0 µm, or 15.0 µm, or 20.0 µm, or 25.0 µm, or 30 µm; and/or
(6) a slip factor of from 30,000, or 35,000, or 39,000 to 40,000, or 45,000, or 50,000, or 52,000, or 55,000, or 60,000; and/or
(7) a coefficient of friction (COF) from 0.05, or 0.10, or 0.15, or 0.19, or 0.20, or 0.24 to 0.25, or 0.26, or 0.27, or 0.28, or 0.29, or 0.30, or 0.31, or 0.32, or 0.33, or 0.34, or 0.35; and/or
(8) a twist retention after aging 7 days of from 66%, or 70% to 75%, or 80%, or 85%, or 90%, or 95%, or 100%; and/or
(9) a yield tension from 5 MPa, or 8 MPa, or 10 MPa, or 13 MPa to 14 MPa, or 15 MPa, or 16 MPa.

In an embodiment, the multilayer film has at least 2, or at least 3, or at least 4, or at least 5, or at least 6, or at least 7, or at least 8, or all 9 of properties (1)-(9).

It is understood that the sum of the components in each of the layers disclosed herein, including the foregoing layers, yields 100 weight percent (wt %), based on the total weight of the respective layer.

In an embodiment, the multilayer film is a coextruded film produced via a cast process. The multilayer film produced via a cast process excludes multilayer films produced via a blown process. Not wishing to be bound by any particular theory, Applicants believe the cast process results in a multilayer film with higher stiffness, which results in improved (i.e., higher) twist retention.

In an embodiment, the multilayer film is not an oriented film. In a further embodiment, the multilayer film is not biaxially oriented. In other words, the multilayer film is not stretched after extrusion.

In an embodiment, the multilayer film is coextruded and is not laminated.

The multilayer film may comprise two or more embodiments disclosed herein.

D. Article

The present disclosure also provides an article containing a multilayer film. The multilayer film may be any multilayer film disclosed herein.

In an embodiment, the article includes a confectionary and a multilayer film in contact with the confectionary. In an embodiment, the multilayer film contains at least three layers including (A) a core layer containing a high density polyethylene (HDPE) having a density from 0.940 g/cc to 0.980 g/cc and, optionally, an additive; and (B) skin layers on opposite sides of the core layer. Each skin layer includes (i) a propylene/ethylene copolymer with from greater than 0 wt % to 5 wt % units derived from ethylene comonomer; (ii) from 3,000 to 3,500 ppm of a slip agent; (iii) from 4,000 to 10,000 ppm of an antiblock agent; and, optionally, (iv) an additive.

The article includes a confectionary. Nonlimiting examples of suitable confectionaries include sugar confections, chocolate confections, and combinations thereof. Nonlimiting examples of sugar confections include lollipops, hard candies, soft candies, licorice, caramels, gum, candied nuts, candied fruits, fudge, taffy, marzipan, taffy, brittle, marshmallows, mints, and combinations thereof. Nonlimiting examples of chocolate confections include fudge, chocolate pieces, chocolate bars, chocolate-covered nuts, chocolate-covered fruits, chocolate mints, and truffles.

The multilayer film may be in direct or in indirect contact with the confectionary. In an embodiment, the multilayer film is in direct contact with the confectionary.

The multilayer film may be twisted and/or folded around the confectionary. In an embodiment, the multilayer film is folded and subsequently twisted at opposing ends of the confectionary.

The article may comprise two or more embodiments disclosed herein.

By way of example, and not limitation, some embodiments of the present disclosure will now be described in detail in the following Examples.

EXAMPLES

Materials used in the examples are provided in Table 1A below.

TABLE 1A

| Material/Description | Properties | Source |
| --- | --- | --- |
| ELITE ™ 5960G (HDPE) (ethylene homopolymer) | MI (I2)(190° C./2.16 kg) = 0.85 g/10 min, Density = 0.962 g/cc, Melting point = 134° C. | The Dow Chemical Company |
| HDPE 05962B (HDPE) (ethylene/1-octene copolymer) | MI (I2)(190° C./2.16 kg) = 5.0 g/10 min, Density = 0.9585 g/cc, Melting point = 132° C. | The Dow Chemical Company |
| DOWLEX ™ 2028B (LLDPE) (ethylene/1-octene copolymer) | MI (I2)(190° C./2.16 kg) = 4.0 g/10 min, Density = 0.941 g/cc, Melting point = 127° C. | The Dow Chemical Company |
| VERSIFY ™ 3000 (propylene/ethylene copolymer) | MFR (230° C./2.16 kg) = 8.0 g/10 min, Density = 0.891 g/cc, Melting point = 108° C., ethylene = 4.5 wt % | The Dow Chemical Company |
| VERSIFY ™ 2000 (propylene/ethylene copolymer) | MFR (230° C./2.16 kg) = 2.0 g/10 min, Density = 0.888 g/cc, Melting point = 107° C., ethylene = 4.5 wt % | The Dow Chemical Company |
| VERSIFY ™ 3401 (propylene/ethylene copolymer) | MFR (230° C./2.16 kg) = 8.0 g/10 min, Density = 0.863 g/cc, Melting point = 55° C., ethylene = 12-15 wt % | The Dow Chemical Company |
| CUYOLEN ™ 1102L (polypropylene homopolymer) | MFR (230° C./2.16 kg) = 5 g/10 min, ethylene = 0 wt % | Petroquimica Cuyo S.A.I.C. |

TABLE 1A-continued

| Material/Description | Properties | Source |
|---|---|---|
| AFFINITY ™ PL 1881G (ethylene/α-olefin copolymer) | MI (I2)(190° C./2.16 kg) = 1.0 g/10 min, Density = 0.904 g/cc, Melting point = 100° C. 2,500 ppm antiblock agent; 750 ppm slip agent | The Dow Chemical Company |
| Slip Agent Masterbatch Ampacet Code 901021 BX | MFR (190° C./2.16 kg) = 30 g/10 min, Density = 0.82 g/cc, Erucamide Content = 2 wt % (in polyethylene matrix) | Ampacet |
| Antiblock Agent Masterbatch Ampacet Code 901300 BX | MFR (190° C./2.16 kg) = 20 g/10 min, Density = 1.05 g/cc, Silica Content = 20 wt % (in polyethylene matrix) | Ampacet |

Multilayer film samples are fabricated on a Collins cast line with the conditions provided in Table 1B.

Two comparative samples are prepared via a blown film process (CS 4 and CS 9). The blown film samples are fabricated on a Collin extruder with the conditions provided in Table 1C.

TABLE 1B

Cast Film Fabrication Conditions
Layer Distribution: Skin Layer (B1)/Core Layer (A)/Skin Layer (B2)

| | | | |
|---|---|---|---|
| Layer Ratio | 20/60/20 | Die Gap (mm) | 0.7 |
| Blower (%) | 23 | Takeoff (m/min) | 23 |
| Total Output (kg/h) | 8.6 | Die Temperature (° C.) | 280 |
| Core Layer (A) Extruder | Temperature Zone 2: 210° C. Temperature Zone 3: 230° C. Temperature Zone 4: 240° C. Temperature Zone 5: 260° C. Temperature Zone 6: 260° C. Temperature Zone 7: 260° C. Rotations Per Minute (rpm): 45 Amps (A): 1 Melt Temperature: 250° C. Melt Pressure: 56 bar Output: 1.79 kg/h | Skin Layer (B2) Extruder | Temperature Zone 2: 220° C. Temperature Zone 3: 250° C. Temperature Zone 4: 270° C. Temperature Zone 5: 280° C. Temperature Zone 6: 280° C. Rotations Per Minute (rpm): 58 Amps (A): 4.1 Melt Temperature: 260° C. Melt Pressure: 141 bar Output: 4.96 kg/h |
| Skin Layer (B1) Extruder | Temperature Zone 2: 210° C. Temperature Zone 3: 230° C. Temperature Zone 4: 240° C. Temperature Zone 5: 260° C. Temperature Zone 6: 280° C. Rotations Per Minute (rpm): 45 Amps (A): 1 Melt Temperature: 249° C. Melt Pressure: 55 bar Output: 1.83 kg/h | | |

TABLE 1C

Blown Film Fabrication Conditions
Layer Distribution: Skin Layer (B1)/Core Layer (A)/Skin Layer (B2)

| | | | |
|---|---|---|---|
| Layer Ratio | 20/60/20 | Die Gap (mm) | 1.8 |
| Blower (%) | 39 | Takeoff (m/min) | 12 |
| Total Output (kg/h) | 13 | Die Temperature (° C.) | 220 |
| Skin Layer (B1) Extruder | Temperature Zone 2: 190° C. Temperature Zone 3: 210° C. Temperature Zone 4: 220° C. Temperature Zone 5: 230° C. Temperature Zone 6: 230° C. Temperature Zone 7: 230° C. Rotations Per Minute (rpm): 30 Amps (A): 1.8 Melt Temperature: 216° C. Melt Pressure: 52 bar Output: 2.74 kg/h | Skin Layer (B2) Extruder | Temperature Zone 2: 190° C. Temperature Zone 3: 210° C. Temperature Zone 4: 220° C. Temperature Zone 5: 230° C. Temperature Zone 6: 230° C. Temperature Zone 7: 230° C. Rotations Per Minute (rpm): 30 Amps (A): 1.8 Melt Temperature: 213° C. Melt Pressure: 70 bar Output: 2.57 kg/h |
| Core Layer (A) Extruder | Temperature Zone 2: 1900° C. Temperature Zone 3: 200° C. Temperature Zone 4: 210° C. Temperature Zone 5: 220° C. Temperature Zone 6: 220° C. Temperature Zone 7: 220° C. | | |

TABLE 1C-continued

Blown Film Fabrication Conditions
Layer Distribution: Skin Layer (B1)/Core Layer (A)/Skin Layer (B2)

Rotations Per Minute (rpm): 50
Amps (A): 2.5
Melt Temperature: 210° C.
Melt Pressure: 127 bar
Output: 2.64 kg/h The layer configurations and the multilayer film structures are provided below in Tables 2-4. Each multilayer film structure is formed with a core layer (A) having a volume that is 60 volume % of the multilayer film, and two skin layers (B1 and B2). Each skin layer (B1 and B2) has a volume that is 20 volume % of the multilayer film. In other words, the combined skin layers (B1 and B2) make up 40 volume % of the multilayer film. In Tables 2-4, the amount of slip agent and antiblock agent refers to the amount of respective slip agent and antiblock agent contained in the layer (rather than the amount of slip agent masterbatch and/or antiblock agent masterbatch contained in the layer). In Tables 2-4, the contents of each layer are recited in weight percent (wt %) and/or ppm (parts per million), based on the total weight of the respective layer. For example, the skin layer (B1) of Ex 1 contains 80.0 wt % VERSIFY™ 3000; 3,000 ppm slip agent (i.e., 0.3 wt % slip agent); 10,000 ppm antiblock agent (i.e., 1.0 wt % antiblock agent); and 18.7 wt % masterbatch polyethylene carrier ("MB PE") (i.e., the combined amount of (i) 14.7 wt % polyethylene carrier from the slip agent masterbatch and (ii) 4.0 wt % polyethylene carrier from the antiblock agent masterbatch), based on the total weight of the skin layer (B1). The core layer (A) of each film of Table 2 (i.e., Ex. 1-7 and CS 1-14) contains 100 wt % ELITE™ 5960G, based on the total weight of the core layer (A). In Tables 2-4, "CS" refers to Comparative Sample, "slip" refers to slip agent, "antiblock" refers to antiblock agent, and "MB PE" refers to the total amount of masterbatch polyethylene carrier.

The multilayer film samples are tested for COF and twist retention. The results are provided below in Tables 2-3.

TABLE 2

| | Extrusion Process | Skin Layer (B1) (20 vol %) | Core Layer (A) (60 vol %) | Skin Layer (B2) (20 vol %) | Thickness (μm) |
|---|---|---|---|---|---|
| Ex 1 | Cast | 80.0% VERSIFY 3000<br>18.7% MB PE<br>3,000 ppm slip<br>10,000 ppm antiblock | ELITE ™ 5960G | 80.0% VERSIFY 3000<br>18.7% MB PE<br>3,000 ppm slip<br>10,000 ppm antiblock | 34 |
| Ex 2 | Cast | 82.0% VERSIFY 3000<br>17.1% MB PE<br>3,000 ppm slip<br>6,000 ppm antiblock | ELITE ™ 5960G | 82.0% VERSIFY 3000<br>17.1% MB PE<br>3,000 ppm slip<br>6,000 ppm antiblock | 36 |
| Ex 3 | Cast | 83.0% VERSIFY 3000<br>16.3% MB PE<br>3,000 ppm slip<br>4,000 ppm antiblock | ELITE ™ 5960G | 83.0% VERSIFY 3000<br>16.3% MB PE<br>3,000 ppm slip<br>4,000 ppm antiblock | 33 |
| Ex 4 | Cast | 77.5% VERSIFY 3000<br>21.15% MB PE<br>3,500 ppm slip<br>10,000 ppm antiblock | ELITE ™ 5960G | 77.5% VERSIFY 3000<br>21.15% MB PE<br>3,500 ppm slip<br>10,000 ppm antiblock | 37 |
| Ex 5 | Cast | 78.5% VERSIFY 3000<br>20.35% MB PE<br>3,500 ppm slip<br>8,000 ppm antiblock | ELITE ™ 5960G | 78.5% VERSIFY 3000<br>20.35% MB PE<br>3,500 ppm slip<br>8,000 ppm antiblock | 36 |
| Ex 6 | Cast | 79.5% VERSIFY 3000<br>19.55% MB PE<br>3,500 ppm slip<br>6,000 ppm antiblock | ELITE ™ 5960G | 79.5% VERSIFY 3000<br>19.55% MB PE<br>3,500 ppm slip<br>6,000 ppm antiblock | 37 |
| Ex 7 | Cast | 80.5% VERSIFY 3000<br>16.3% MB PE<br>3,500 ppm slip<br>4,000 ppm antiblock | ELITE ™ 5960G | 80.5% VERSIFY 3000<br>16.3% MB PE<br>3,500 ppm slip<br>4,000 ppm antiblock | 36 |
| CS 1 | Cast | 85.5% VERSIFY 3000<br>13.85% MB PE<br>2,500 ppm slip<br>4,000 ppm antiblock | ELITE ™ 5960G | 85.5% VERSIFY 3000<br>13.85% MB PE<br>2,500 ppm slip<br>4,000 ppm antiblock | 34 |
| CS 2 | Cast | 84.5% VERSIFY 3000<br>14.65% MB PE<br>2,500 ppm slip<br>6,000 ppm antiblock | ELITE ™ 5960G | 84.5% VERSIFY 3000<br>14.65% MB PE<br>2,500 ppm slip<br>6,000 ppm antiblock | 34 |
| CS 3 | Cast | 83.5% VERSIFY 3000<br>15.45% MB PE<br>2,500 ppm slip<br>8,000 ppm antiblock | ELITE ™ 5960G | 83.5% VERSIFY 3000<br>15.45% MB PE<br>2,500 ppm slip<br>8,000 ppm antiblock | 34 |
| CS 4 | Blown | 87.5% VERSIFY 3000<br>11.35% MB PE<br>1,500 ppm slip<br>10,000 ppm antiblock | ELITE ™ 5960G | 87.5% VERSIFY 3000<br>11.35% MB PE<br>1,500 ppm slip<br>10,000 ppm antiblock | 30 |

TABLE 2-continued

| | | | | | |
|---|---|---|---|---|---|
| CS 5 | Cast | 86.25% VERSIFY 3000<br>12.575% MB PE<br>1,750 ppm slip<br>10,000 ppm antiblock | ELITE ™ 5960G | 86.25% VERSIFY 3000<br>12.575% MB PE<br>1,750 ppm slip<br>10,000 ppm antiblock | 31 |
| CS 6 | Cast | 85.0% VERSIFY 3000<br>13.8% MB PE<br>2,000 ppm slip<br>10,000 ppm antiblock | ELITE ™ 5960G | 85.0% VERSIFY 3000<br>13.8% MB PE<br>2,000 ppm slip<br>10,000 ppm antiblock | 31 |
| CS 7 | Cast | 83.75% VERSIFY 3000<br>15.025% MB PE<br>2,250 ppm slip<br>10,000 ppm antiblock | ELITE ™ 5960G | 83.75% VERSIFY 3000<br>15.025% MB PE<br>2,250 ppm slip<br>10,000 ppm antiblock | 32 |
| CS 8 | Cast | 82.5% VERSIFY 3000<br>16.25% MB PE<br>2,500 ppm slip<br>10,000 ppm antiblock | ELITE ™ 5960G | 82.5% VERSIFY 3000<br>16.25% MB PE<br>2,500 ppm slip<br>10,000 ppm antiblock | 31 |
| CS 9 | Blown | 82.5% VERSIFY 3000<br>16.25% MB PE<br>2,500 ppm slip<br>10,000 ppm antiblock | ELITE ™ 5960G | 82.5% VERSIFY 3000<br>16.25% MB PE<br>2,500 ppm slip<br>10,000 ppm antiblock | 32 |
| CS 10 | Cast | 100% VERSIFY 3000 | ELITE ™ 5960G | 100% VERSIFY 3000 | 22 |
| CS 11 | Cast | 100% VERSIFY 3000 | ELITE ™ 5960G | 100% VERSIFY 3000 | 29 |
| CS 12 | Cast | 95.0% VERSIFY 3000<br>4.0% MB PE<br>10,000 ppm antiblock | ELITE ™ 5960G | 95.0% VERSIFY 3000<br>4.0% MB PE<br>10,000 ppm antiblock | 22 |
| CS 13 | Cast | 87.5% VERSIFY 3000<br>11.35% MB PE<br>1,500 ppm slip<br>10,000 ppm antiblock | ELITE ™ 5960G | 100% VERSIFY 3000 | 29 |

| | Slip | | Twist Retention | | | | | |
|---|---|---|---|---|---|---|---|---|
| | Factor | COF | Day 1 | Day 2 | Day 3 | Day 4 | Day 7 | TR (%) |
| Ex 1 | 41,040 | 0.32 | 6 | 6 | 6 | 6 | 6 | 100 |
| Ex 2 | 42,768 | 0.35 | 6 | 6 | 6 | 6 | 5 | 83 |
| Ex 3 | 39,360 | 0.32 | 6 | 6 | 6 | 6 | 4 | 67 |
| Ex 4 | 51,688 | 0.30 | 6 | 6 | 6 | 4 | 4 | 67 |
| Ex 5 | 50,064 | 0.31 | 6 | 5 | 5 | 5 | 5 | 83 |
| Ex 6 | 51,296 | 0.28 | 6 | 6 | 6 | 6 | 6 | 100 |
| Ex 7 | 49,728 | 0.24 | 6 | 6 | 5 | 5 | 5 | 83 |
| CS 1 | 34,000 | 0.40 | 6 | 5 | 3 | 3 | 3 | 50 |
| CS 2 | 34,440 | 0.41 | 6 | 6 | 6 | 3 | 2 | 33 |
| CS 3 | 33,720 | 0.45 | 6 | 6 | 6 | 5 | 5 | 83 |
| CS 4 | 18,000 | 0.28 | 4 | 4 | 2 | 2 | 0 | 0 |
| CS 5 | 21,700 | 0.54 | 6 | 6 | 6 | 6 | 5 | 83 |
| CS 6 | 24,800 | 0.45 | 6 | 5 | 4 | 4 | 4 | 67 |
| CS 7 | 28,800 | 0.42 | 5 | 4 | 4 | 3 | 2 | 40 |
| CS 8 | 31,000 | 0.43 | 6 | 6 | 6 | 6 | 4 | 67 |
| CS 9 | 26,880 | 0.33 | 0 | 0 | 0 | 0 | 0 | 0 |
| CS 10 | 0 | 0.96 | 5 | 5 | 5 | 5 | 5 | 100 |
| CS 11 | 0 | 0.54 | 5 | 5 | 5 | 5 | 5 | 100 |
| CS 12 | 0 | 0.85 | 5 | 5 | 5 | 5 | 5 | 100 |
| CS 13 | 8,592 | 1.11 | 5 | 5 | 5 | 5 | 5 | 100 |

TABLE 3*

| | Skin Layer (B1)<br>(20 vol %) | Core Layer (A)<br>(60 vol %) | Skin Layer (B2)<br>(20 vol %) | Thickness (μm) | Slip Factor | COF+ | Day 1 | Day 2 | Day 3 | Day 4 | Day 7 | TR (%) |
|---|---|---|---|---|---|---|---|---|---|---|---|---|
| CS 14 | 87.5% ELITE 5960G<br>11.35% MB PE<br>1,500 ppm slip<br>10,000 ppm antiblock | 100% ELITE 5960G | 87.5% ELITE 5960G<br>11.35% MB PE<br>1,500 ppm slip<br>10,000 ppm antiblock | 29 | 17,256 | 0.54 | 5 | 5 | 5 | 5 | 5 | 100 |
| CS 15 | 92.5% DOWLEX 2028B<br>7.35% MB PE<br>1,500 ppm slip | 98.0% ELITE 5960G<br>1.96% MB PE<br>400 ppm slip | 85.5% DOWLEX 2028B<br>2.0% VERSIFY 3401<br>11.35% MB PE<br>1,500 ppm slip<br>10,000 ppm antiblock | 30 | 25,200 | 0.32 | 0 | 0 | 0 | 0 | 0 | 0 |
| CS 16 | 92.5% DOWLEX 2028B<br>7.35% MB PE<br>1,500 ppm slip | 98.0% ELITE 5960G<br>1.96% MB PE<br>400 ppm slip | 80.5% DOWLEX 2028B<br>2.0% VERSIFY 3401<br>16.25% MB PE<br>2,500 ppm slip<br>10,000 ppm antiblock | 30 | 31,200 | 0.32 | 0 | 0 | 0 | 0 | 0 | 0 |

TABLE 3*-continued

| | Skin Layer (B1) (20 vol %) | Core Layer (A) (60 vol %) | Skin Layer (B2) (20 vol %) | Thickness (μm) | Slip Factor | COF⁺ | Twist Retention Day 1 | Day 2 | Day 3 | Day 4 | Day 7 | TR (%) |
|---|---|---|---|---|---|---|---|---|---|---|---|---|
| CS 17 | 84.5% DOWLEX 2028B 3.0% VERSIFY 3401 11.35% MB PE 1,500 ppm slip 10,000 ppm antiblock | 98.0% ELITE 5960G 1.96% MB PE 400 ppm slip | 84.5% DOWLEX 2028B 3.0% VERSIFY 3401 11.35% MB PE 1,500 ppm slip 10,000 ppm antiblock | 31 | 26,124 | — | 1 | 0 | 0 | 0 | 0 | 0 |
| CS 18 | 92.5% DOWLEX 2028B 7.35% MB PE 1,500 ppm slip | 98.0% ELITE 5960G 1.96% MB PE 400 ppm slip | 84.5% DOWLEX 2028B 3.0% VERSIFY 3401 11.35% MB PE 1,500 ppm slip 10,000 ppm antiblock | 30 | 25,200 | 0.37 | 2 | 2 | 1 | 1 | 1 | 50 |
| CS 19 | 83.5% DOWLEX 2028B 4.0% VERSIFY 3401 11.35% MB PE 1,500 ppm slip 10,000 ppm antiblock | 98.0% ELITE 5960G 1.96% MB PE 400 ppm slip | 83.5% DOWLEX 2028B 4.0% VERSIFY 3401 11.35% MB PE 1,500 ppm slip 10,000 ppm antiblock | 30 | 24,864 | — | 2 | 1 | 1 | 1 | 0 | 0 |
| CS 20 | 92.5% DOWLEX 2028B 7.35% MB PE 1,500 ppm slip | 98.0% ELITE 5960G 1.96% MB PE 400 ppm slip | 83.5% DOWLEX 2028B 4.0% VERSIFY 3401 11.35% MB PE 1,500 ppm slip 10,000 ppm antiblock | 30 | 25,368 | 0.35 | 1 | 0 | 0 | 0 | 0 | 0 |
| CS 21 | 82.5% DOWLEX 2028B 5.0% VERSIFY 3401 11.35 1,500 ppm slip 10,000 ppm antiblock | 98.0% ELITE 5960G 1.96% MB PE 400 ppm slip | 82.5% DOWLEX 2028B 5.0% VERSIFY 3401 11.35% MB PE 1,500 ppm slip 10,000 ppm antiblock | 30 | 24,780 | — | 2 | 1 | 0 | 0 | 0 | 0 |
| CS 22 | 92.5% DOWLEX 2028B 7.35% MB PE 1,500 ppm slip | 98.0% ELITE 5960G 1.96% MB PE 400 ppm slip | 82.5% DOWLEX 2028B 5.0% VERSIFY 3401 11.35% MB PE 1,500 ppm slip 10,000 ppm antiblock | 30 | 25,578 | 0.34 | 3 | 1 | 0 | 0 | 0 | 0 |
| CS 23 | 80.5% DOWLEX 2028B 7.0% VERSIFY 3401 11.35% MB PE 1,500 ppm slip 10,000 ppm antiblock | 98.0% ELITE 5960G 1.96% MB PE 400 ppm slip | 80.5% DOWLEX 2028B 7.0% VERSIFY 3401 11.35% MB PE 1,500 ppm slip 10,000 ppm antiblock | 31 | 25,830 | — | 2 | 0 | 0 | 0 | 0 | 0 |
| CS 24 | 92.5% DOWLEX 2028B 7.35% MB PE 1,500 ppm slip | 98.0% ELITE 5960G 1.96% MB PE 400 ppm slip | 80.5% DOWLEX 2028B 7.0% VERSIFY 3401 11.35% MB PE 1,500 ppm slip 10,000 ppm antiblock | 30 | 25,200 | 0.33 | 3 | 1 | 0 | 0 | 0 | 0 |
| CS 25 | 100% HDPE 05962B | 98.0% ELITE 5960G 1.96% MB PE 400 ppm slip | 100% HDPE 05962B | 32 | 7,740 | — |  | 2 | 1 | 1 | 1 | 50 |
| CS 26 | 87.5% ELITE 5960G 11.35% MB PE 1,500 ppm slip 10,000 ppm antiblock | 100% ELITE 5960G | 87.5% ELITE 5960G 11.35% MB PE 1,500 ppm slip 10,000 ppm antiblock | 29 | 17,256 | 0.54 | 5 | 5 | 5 | 5 | 5 | 100 |
| CS 27 | 100% VERSIFY 2000 | 100% ELITE 5960G | 100% VERSIFY 2000 | 21 | 0 | 0.91 | 5 | 5 | 5 | 5 | 5 | 100 |
| CS 28 | 87.5% VERSIFY 2000 11.35% MB PE 1,500 ppm slip 10,000 ppm antiblock | 100% ELITE 5960G | 87.5% VERSIFY 2000 11.35% MB PE 1,500 ppm slip 10,000 ppm antiblock | 30 | 17,712 | 0.49 | 5 | 4 | 4 | 3 | 3 | 60 |
| CS 29 | 87.5% VERSIFY 2000 11.35% MB PE 1,500 ppm slip 10,000 ppm antiblock | 100% ELITE 5960G | 87.5% VERSIFY 2000 11.35% MB PE 1,500 ppm slip 10,000 ppm antiblock | 22 | 13,128 | 0.61 | 5 | 5 | 5 | 5 | 5 | 100 |

*All multilayer film samples of Table 3 are prepared via a cast extrusion process.
⁺Coefficient of Friction (COF) was not measured for CS 17, CS 19, CS 21, CS 23, and CS 25 because each exhibited poor twist retention (i.e., ≤50% twist retention), indicating the multilayer films are not suitable for twist packaging.

Comparative sample films containing three layers including (A) a core layer containing HDPE having a density of 0.940-0.980 g/cc; and (B) skin layers on opposite sides of the core layer, at least one skin layer containing (i) a propylene/ethylene copolymer with greater than 5 wt % units derived from ethylene comonomer (i.e., VERSIFY™ 3401, containing 12-15 wt % ethylene); (ii) a slip agent; and (iii) an antiblock agent (CS 15-24) exhibit a low twist retention (<66%), indicating the multilayer films are not suitable for twist packaging.

Comparative sample films containing three layers including (A) a core layer containing HDPE having a density of 0.940-0.980 g/cc; and (B) skin layers on opposite sides of the core layer, at least one skin layer containing (i) a propylene/ethylene copolymer with from greater than 0 wt % to 5 wt % units derived from ethylene comonomer; (ii) less than 3,000 ppm a slip agent; and (iii) 4,000-10,000 ppm antiblock agent (CS 1-3, 5-8 and 12) exhibit high COF (>0.35), indicating the multilayer films are not suitable for twist packaging.

Applicant surprisingly discovered multilayer films containing three layers including (A) a core layer containing HDPE having a density of 0.940-0.980 g/cc; and (B) skin layers on opposite sides of the core layer, each skin layer containing (i) a propylene/ethylene copolymer with from greater than 0 wt % to 5 wt % units derived from ethylene comonomer; (ii) 3,000-3,500 ppm of a slip agent; and (iii) 4,000-10,000 ppm of an antiblock agent (Ex. 1-7) advantageously exhibit a unique balance of high twist retention (66%-100%) and low COF (0.05-0.35).

The multilayer film samples are tested for yield tension. The results are provided in Table 4.

TABLE 4*

| | Skin Layer (B1) (20 vol %) | Core Layer (A) (60 vol %) | Skin Layer (B2) (20 vol %) | Thickness (μm) | Slip Factor | COF | Yield Tension (MPa) |
|---|---|---|---|---|---|---|---|
| Ex 8 | 78.5% VERSIFY 3000 20.35% MB PE 3,500 ppm slip 8,000 ppm antiblock | 100% ELITE ™ 5960G | 78.5% VERSIFY 3000 20.35% MB PE 3,500 ppm slip 8,000 ppm antiblock | 31 | 43,400 | 0.23 | 13.5 |
| CS 30# | 95.0% CUYOLEN 1102L 5.0% AFFINITY ™ 1881 | 100% ELITE ™ 5960G | 95.0% CUYOLEN 1102L 5.0% AFFINITY ™ 1881 | 28.3 | 430 | 0.38 | 16.4 |

*All multilayer film samples of Table 4 are prepared via a cast extrusion process.
AFFINITY ™ 1881 contains 99.675 wt % ethylene/α-olefin copolymer, 2,500 ppm antiblock agent, and 750 ppm slip agent. CS 30 contains 5 wt % AFFINITY ™ 1881 in each skin layer, based on the total weight of the respective skin layer. Thus, each skin layer of CS 30 contains 4.984 wt % ethylene/α-olefin copolymer, 125 ppm antiblock agent, and 37.5 ppm slip agent, based on the total weight of the respective skin layer.

A comparative sample film containing three layers including (A) a core layer containing HDPE having a density of 0.940-0.980 g/cc; and (B) skin layers on opposite sides of the core layer, at least one skin layer containing (i) a polymeric blend containing polypropylene homopolymer (CUYOLEN™ 1102L) and from greater than 0 wt % to 5 wt % ethylene-based polymer (AFFINITY™ 1881); (ii) 37.5 ppm of a slip agent; and (iii) 125 ppm of an antiblock agent (CS 30) exhibits a high yield tension (>16 MPa).

Applicant surprisingly discovered multilayer films containing three layers including (A) a core layer containing HDPE having a density of 0.940-0.980 g/cc; and (B) skin layers on opposite sides of the core layer, each skin layer containing (i) a propylene/ethylene copolymer with from greater than 0 wt % to 5 wt % units derived from ethylene comonomer; (ii) 3,000-3,500 ppm of a slip agent; (iii) 4,000-10,000 ppm of an antiblock agent (Ex. 8) advantageously exhibit a low yield tension (≤16 MPa).

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A multilayer film consisting of three layers:
   (A) a core layer comprising from 97 wt % to 100 wt % of a high density polyethylene (HDPE) having a density from 0.940 g/cc to 0.980 g/cc, and from 3 wt % to 0 wt % of an additive;
   (B) skin layers on opposite sides of the core layer, each skin layer is an outermost layer and comprises
      (i) a propylene/ethylene copolymer with from greater than 0 wt % to 5 wt % units derived from ethylene comonomer;
      (ii) from 3,000 to 3,500 ppm of a slip agent; and
      (iii) from 4,000 to 10,000 ppm of an antiblock agent;
   the multilayer film having a coefficient of friction (COF) from 0.05 to 0.35 and a twist retention after 7 days from 66% to 100%.

2. The multilayer film of claim 1, wherein the multilayer film has a thickness from 15 μm to 100 μm.

3. The multilayer film of claim 1, wherein from 40 vol % to 90 vol % of the multilayer film is the core layer and a combined volume of the skin layers is from 10 vol % to 60 vol % of the multilayer film, the multilayer film having a twist retention after 7 days from 66% to 100%.

4. The multilayer film of claim 1, wherein the multilayer film is a cast film.

5. The multilayer film of claim 1, wherein the HDPE has a melt index from 0.1 g/10 min to 1 g/10 min.

6. The multilayer film of claim 1, wherein the propylene/ethylene copolymer is a random copolymer with a melt flow rate from 2 g/10 min to 15.0 g/10 min.

7. The multilayer film of claim 1, wherein the slip agent is selected from the group consisting of a fatty acid amide, a silicone, and combinations thereof.

8. The multilayer film of claim 7, wherein the antiblock agent is selected from the group consisting of silica, talc, calcium carbonate, and combinations thereof.

9. The multilayer film of claim 1, wherein from 40 vol % to 90 vol % of the multilayer film is the core layer and a combined volume of the skin layers is from 10 vol % to 60 vol % of the multilayer film, the multilayer film having a coefficient of friction (COF) from 0.05 to 0.35 and a twist retention after 7 days from 66% to 100%, and each skin layer comprising:
   (i) propylene/ethylene random copolymer having a melt flow rate from 2 g/10 min to 8 g/10 min;
   (ii) the slip agent selected from the group consisting of erucamide, oleamide, palmitamide, stearamide, behenamide, polydimethylsiloxane, and combinations thereof; and
   (iii) silica.

10. An article comprising:
   a confectionary;
   a multilayer film in contact with the confectionary, the multilayer film consisting of three layers
      (A) from 40 vol % to 90 vol % of a core layer comprising from 97 wt % to 100 wt % of a high density polyethylene (HDPE) having a density from 0.940 g/cc to 0.980 g/cc, and from 3 wt % to 0 wt % of an additive;
      (B) from 10 vol % to 60 vol % of skin layers on opposite sides of the core layer, vol % based on total volume of the multilayer film, each skin layer comprising (i) a propylene/ethylene copolymer with from greater than 0 wt % to 5 wt % units derived from ethylene comonomer;
(ii) from 3,000 to 3,500 ppm of a slip agent; and
(iii) from 4,000 to 10,000 ppm of an antiblock agent;
the multilayer film having a coefficient of friction (COF) from 0.05 to 0.35 and a twist retention after 7 days from 66% to 100%.

11. The article of claim 10, wherein the multilayer film is in direct contact with the confectionary.

12. The article of claim 10, wherein the multilayer film is twisted around the confectionary.

13. The multilayer film of claim 1 wherein the core layer consists of HDPE and an additive selected from the group consisting of antioxidants, antistatic agents, stabilizing agents, nucleating agents, colorants, ultra violet (UV) absorbers or stabilizers, flame retardants, compatibilizers, plasticizers, fillers, processing aids, crosslinking agents (e.g., peroxides), and combinations thereof.

14. The article of claim 10 wherein the core layer consists of HDPE and an additive selected from the group consisting of antioxidants, antistatic agents, stabilizing agents, nucleating agents, colorants, ultra violet (UV) absorbers or stabilizers, flame retardants, compatibilizers, plasticizers, fillers, processing aids, crosslinking agents (e.g., peroxides), and combinations thereof.

15. The multilayer film of claim 9 wherein the core layer consists of HDPE.

16. The multilayer film of claim 15 wherein each skin layer comprises
(i) from 77.5 wt % to 83 wt % of a propylene/ethylene copolymer with from greater than 0 wt % to 5 wt % units derived from ethylene comonomer;
(ii) from 3,000 to 3,500 ppm of the slip agent;
(iii) from 4,000 to 10,000 ppm of silica; and
(iv) from 16.3 wt % to 21.15 wt % polyethylene,
wherein weight percent is based on the total weight of the skin layer.

17. The multilayer film of claim 10 wherein the core layer consists of HDPE.

18. The multilayer film of claim 17 wherein each skin layer comprises
(i) from 77.5 wt % to 83 wt % of a propylene/ethylene copolymer with from greater than 0 wt % to 5 wt % units derived from ethylene comonomer;
(ii) from 3,000 to 3,500 ppm of the slip agent;
(iii) from 4,000 to 10,000 ppm of the antiblock agent; and
(iv) from 16.3 wt % to 21.15 wt % polyethylene;
wherein weight percent is based on the total weight of the skin layer.

* * * * *